United States Patent
Edwards

(10) Patent No.: US 12,351,304 B2
(45) Date of Patent: Jul. 8, 2025

(54) WING-BOX STRUCTURE

(71) Applicant: AIRBUS OPERATIONS LIMITED, Bristol (GB)

(72) Inventor: Henry Edwards, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 14 days.

(21) Appl. No.: 18/297,310

(22) Filed: Apr. 7, 2023

(65) Prior Publication Data

US 2023/0322355 A1 Oct. 12, 2023

(30) Foreign Application Priority Data

Apr. 8, 2022 (GB) ..................................... 2205184

(51) Int. Cl.
*B64C 3/18* (2006.01)

(52) U.S. Cl.
CPC .............. *B64C 3/185* (2013.01); *B64C 3/187* (2013.01)

(58) Field of Classification Search
CPC ................................ B64C 3/185; B64C 3/187
See application file for complete search history.

(56) References Cited

U.S. PATENT DOCUMENTS

| | | | |
|---|---|---|---|
| 2,749,061 A | 6/1956 | Franz | |
| 4,481,703 A * | 11/1984 | Scott | B64C 3/187 244/123.1 |
| 4,739,954 A | 4/1988 | Hamilton | |
| 6,776,371 B2 | 8/2004 | Tanaka et al. | |
| 7,238,409 B1 | 7/2007 | Peterson et al. | |
| 8,393,871 B2 * | 3/2013 | Yarbrough | F03D 1/0675 416/233 |
| 8,870,120 B2 * | 10/2014 | Sanderson | B64C 3/26 428/189 |
| 8,973,870 B2 * | 3/2015 | Endres | B64C 1/18 244/131 |
| 9,341,207 B2 | 5/2016 | Grieco | |
| 10,035,578 B2 * | 7/2018 | Nordin | B64D 15/12 |
| 10,071,794 B2 * | 9/2018 | Abe | B29C 65/48 |
| 10,647,406 B2 * | 5/2020 | Deck | B64C 3/185 |

(Continued)

FOREIGN PATENT DOCUMENTS

| | | |
|---|---|---|
| EP | 1 780 120 | 5/2007 |
| EP | 3 409 579 | 12/2018 |

(Continued)

OTHER PUBLICATIONS

Extended European Search Report for Application No. EP 23163113. 6, eight pages, dated Aug. 14, 2023.

(Continued)

*Primary Examiner* — Philip J Bonzell
*Assistant Examiner* — Michael B. Kreiner
(74) *Attorney, Agent, or Firm* — Nixon & Vanderhye P.C.

(57) ABSTRACT

A wing-box structure for an aircraft is disclosed having an upper cover, a lower cover, longitudinal forward and rearward spars, and a plurality of transverse ribs. One of the transverse ribs is retained by a pair of opposed captive features disposed on an interior side of either the forward and rearward spars or the upper and lower covers. The rib is bonded rib to the forward and rearward spars and/or the upper and lower covers at a location where the rib is retained.

18 Claims, 5 Drawing Sheets

(56) References Cited

U.S. PATENT DOCUMENTS

| | | | |
|---|---|---|---|
| 11,981,426 B2 * | 5/2024 | Kamila | B64C 3/185 |
| 2006/0113450 A1 | 6/2006 | Kilwin et al. | |
| 2008/0072527 A1 | 3/2008 | Kondo et al. | |
| 2016/0318597 A1 | 11/2016 | Kent | |

FOREIGN PATENT DOCUMENTS

| | | |
|---|---|---|
| EP | 2 969 743 B1 | 10/2020 |
| GB | 2584423 | 12/2020 |
| WO | 01/76939 | 10/2001 |

OTHER PUBLICATIONS

Combined Search and Examination Report for GB2205184.1, dated Sep. 27, 2022, 6 pages.

* cited by examiner

WING-BOX STRUCTURE

CROSS RELATED APPLICATION

This application claims priority to United Kingdom Patent Application GB 2205184.1, filed Apr. 8, 2022, the entire contents of which is hereby incorporated by reference.

FIELD OF THE INVENTION

The present invention relates to a wing-box structure, an aircraft including a wing-box structure, and a method of assembling a wing-box structure.

BACKGROUND OF THE INVENTION

Conventional wing box construction, e.g. for large aircraft, comprises wing covers (skins and stringers), spars and ribs. Ribs are vertical structures connecting the upper cover, lower cover and spars. These act as panel breakers to help stabilise the covers in buckling, reaction of external loads and provide resistance to crushing "Brazier" loads due to wing bending. Ribs can also form a fuel tank boundary and have systems penetration/mounting interfaces for fuel pipes and hydraulic routings. Typical ribs may have castellation features around their perimeter to allow stringers to pass through and to manage the fuel/air bubble inside the wing tank.

Ribs are installed by drilling holes between the rib feet and covers, or by drilling into the rib web to fix to spar posts. This provides the enclosed circumference of structural attachment needed to make the ribs effective at resisting wing loads (shear, for example). Even on more recent aircraft with carbon-fibre reinforced polymer (CFRP) wing covers and spars, a bolted interface between ribs and covers is used. This requires expensive, complex automated drilling and bolting equipment to make the joint. There may be thousands of fasteners on each wingset. This increases industrial lead time and could act as a barrier to higher rate production.

In conventional wing-box assembly, the covers are typically "offered" up to the ribs and drilled off. The covers are then removed to allow clean up of the holes and then wet assembled and/or shimmed to manage build stress at the rib to cover connections. Once the shims are installed, bolts can then be applied post-clean up to create the structural connection. This requires access to the inside of the wing as fasteners are installed "outside in". This is a highly labour-intensive process. Managing tolerances is a challenge, with each hole being "dipped" to ensure the correct length of bolt, followed by a sealant/nut cap being applied to ensure lightning strike compatibility.

Some other aircraft use a bonded structure to make the connection between ribs and covers. This involves a paste adhesive being applied to structural elements prior to join up, then the cover is lowered onto the ribs and spars. This process still has discrete ribs, spars and covers. The joining technique is changed but still the same architecture of parts as conventional wing-box assembly described above.

Filament wound structures have the potential to remove joints, by integrating parts together to form an enclosed "sock" (fully integrated spars and covers) that can be cured and forms the core of the wing structure. This may still require ribs to support the structure. Machines have been developed able to layup and wind complex 3 d geometries (filament winding).

There is a need to improve the connection of ribs to the spars and/or covers in methods of manufacturing wing-boxes, not only for main aircraft wings but also for vertical and horizontal tailplane structures and wing-tip devices.

SUMMARY OF THE INVENTION

A first aspect of the invention provides a wing-box structure for an aircraft, comprising an upper cover, a lower cover, longitudinal forward and rearward spars, and a plurality of transverse ribs, wherein one of the transverse ribs is retained by a pair of opposed captive features disposed on an interior side of either the forward and rearward spars or the upper and lower covers, and adhesive or weldable material for bonding the rib to the forward and rearward spars and/or the upper and lower covers at a location where the rib is retained.

The invention provides an improved mechanical connection between the rib and spars and/or covers. In this context the 'captive features' are structural elements which are designed to provide a mechanical hold on the rib when the rib is installed in the wing-box structure. The captive features are provided as an opposed pair on opposite sides of the rib so that the rib is mutually held by the opposing pair of captive features. The captive features are used to hold the rib in situ during assembly of wing-box structure, in particular during bonding of the rib to the spars and/or covers. The bonding transfers the majority or all of the in-service load between the rib and the spars and/or covers. The captive features remain in the completed wing-box structure after bonding the rib but do not see much or any in-service loads.

The invention may provide a number of opportunities in positioning and connecting ribs to the rest of the wing-box structure versus traditional bolted solutions:

1) The captive features may provide a means to hold ribs in place, without bolting, and when combined with adhesive or welding the ribs can be secured in a low build stress state. This allows for a more weight efficient structure, resulting in lower cost and reduced fuel burn related emissions in service.
2) The captive features preferably do not require access to both sides of the wing-box and the ribs installation can be from a root end of the wing-box structure in sequence—without complex tooling to hold parts in place.
3) An assembly process for manufacturing the wing-box structure can be much faster than today's approach—enabling higher rate production of composite wings.
4) Preferably there are no (or very few) fastener holes for connecting the rib to the spars/covers, allowing better lighting strike protection, plus avoidance of any leak paths out of the structure. The absence of fastener holes promotes a thinner composite spar and/or cover in the vicinity of the rib-to-cover and/or rib-to-spar joint as no or little composite thickness build up around fastener holes is required, which achieves significant weight savings.

A further aspect of the invention provides an aircraft wing, vertical tailplane, horizontal tailplane, wing-tip device, or any aerofoil structure comprising a wing-box structure according to the first aspect.

A further aspect of the invention provides a method of assembling a wing-box structure, comprising at least partially assembling an upper cover, a lower cover, and longitudinal forward and rearward spars; providing a pair of opposed captive features on an interior side of either the forward and rearward spars or the upper and lower covers;

passing at least one transverse rib along the at least partially assembled upper and lower covers and longitudinal forward and rearward spars until the rib engages with the pair of opposed captive features so that the rib is retained by the pair of opposed captive features; and bonding the rib to the forward and rearward spars and/or the upper and lower covers at a location where the rib is retained.

The captive features may each comprise a projection or a recess on or into an interior surface of the forward and rearward spars or the upper and lower covers with which the rib is engaged to constrain the rib from translation over the interior surface. Each captive feature may include a plurality of protrusions and/or recesses.

The rib may be configured to be translated to become captive against or in the projection or recess to form a snap-fit, or 'click fit', connection.

The captive features may be attached to or integrated with the forward and rearward spars or the upper and lower covers.

Each projection may be a ramp having a sloping face and a bluff face.

Each recess may cooperate with a respective projection formed on the rib, or each projection may cooperate with a respective projection formed on the rib.

The wing-box structure may further comprise one or more fasteners for fastening the rib to the forward and rearward spars and/or the upper and lower covers at a location where the rib is retained.

At least one or the forward and rearward spars may be integrally formed with at least one of the upper and lower covers.

The forward and rearward spars and/or the upper and lower covers may converge in the longitudinal direction of the wing-box structure.

The convergence of the forward and rearward spars and/or the upper and lower covers may constrain movement of the rib away from the captive features, so that the rib is retained between the captive features and the convergent geometry.

The captive features may be configured to allow one-way installation of the rib. That is, the rib installation progresses only in one direction to form a permanent installation of the rib in the wing-box structure.

The wing-box structure may further comprise a respective pair of opposed captive features on either the forward and rearward spars or the upper and lower covers for each respective transverse rib. Each of the respective transverse ribs may be retained by the respective pair of opposed captive features.

The method may further comprise providing a respective pair of opposed captive features on either the forward and rearward spars or the upper and lower covers for each respective transverse rib, and passing each of a plurality of transverse ribs along the at least partially assembled upper and lower covers and longitudinal forward and rearward spars until the respective rib engages with the pair of opposed captive features so that the respective rib is retained by the respective pair of opposed captive features.

The forward and rearward spars and/or the upper and lower covers may converge in the longitudinal direction of the wing-box structure, and wherein the plurality of transverse ribs have different sizes, the method further comprising passing the plurality of transverse ribs along the assembly in the direction of the convergence in order of increasing rib size.

At least one transverse rib may be passed along the assembly in a first orientation in which the rib is tilted towards a plane of the upper or lower covers, and then rotated to a second orientation in the vicinity of the pair of opposed captive features.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
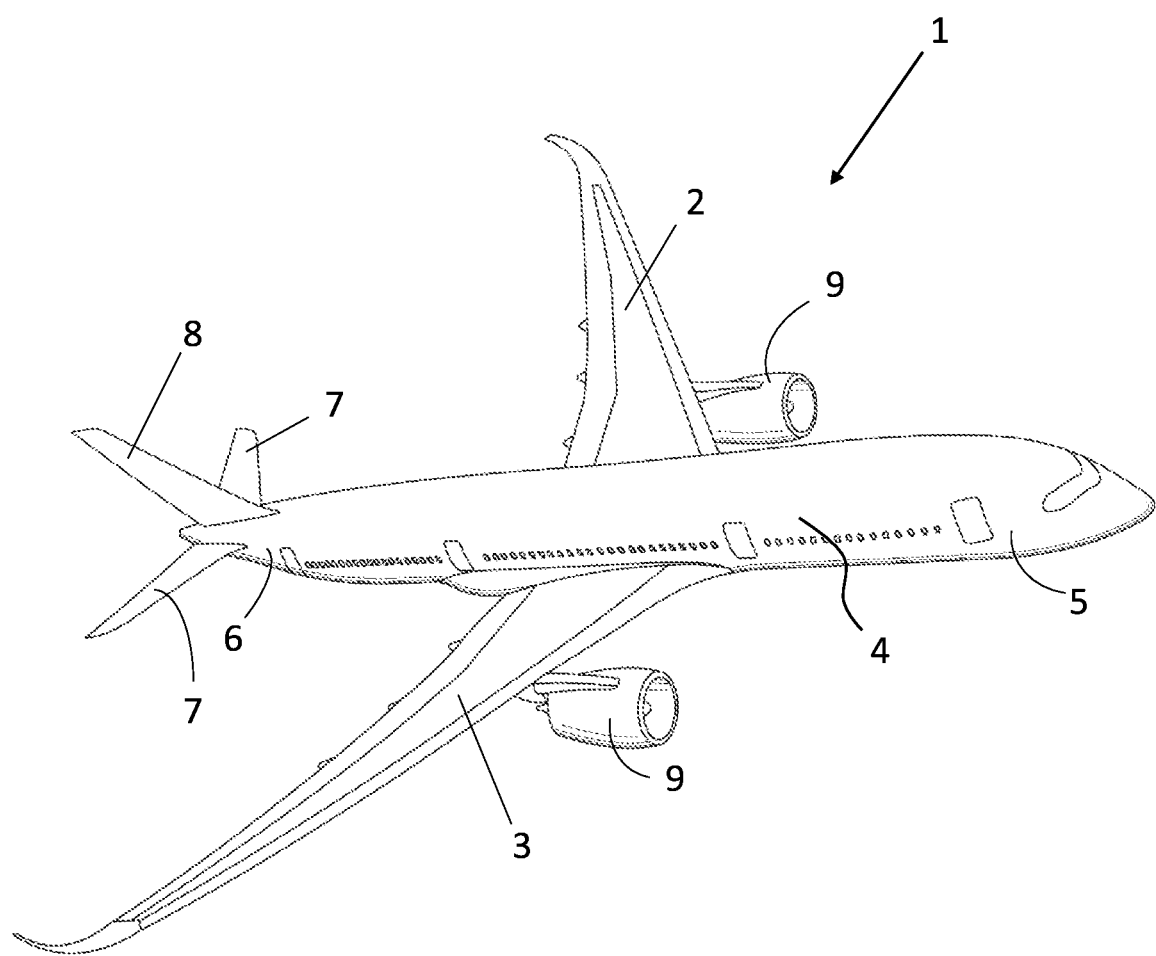
FIG. 1 shows a perspective view of an aircraft.

FIG. 1 illustrates a typical fixed wing aircraft 1 having a port wing 2 and starboard wing 3 carrying wing mounted engines 9, the wings 2, 3 extending from a fuselage 4. The fuselage has a nose 5 and a tail 6 with horizontal and vertical stabiliser surfaces 7, 8 near the tail 6. The aircraft 1 is a typical jet passenger transonic transport aircraft but the invention is applicable to a wide variety of fixed wing aircraft types, including commercial, military, passenger, cargo, jet, propeller, general aviation, etc. with any number of engines attached to the wings or fuselage.

Each wing 2, 3 has a cantilevered structure with a length extending in a span-wise direction from a root to a tip, the root being joined to an aircraft fuselage 4. The wings 2, 3 are similar in construction so only the starboard wing 3 will be described in detail with reference to FIG. 3.

Figure 2:
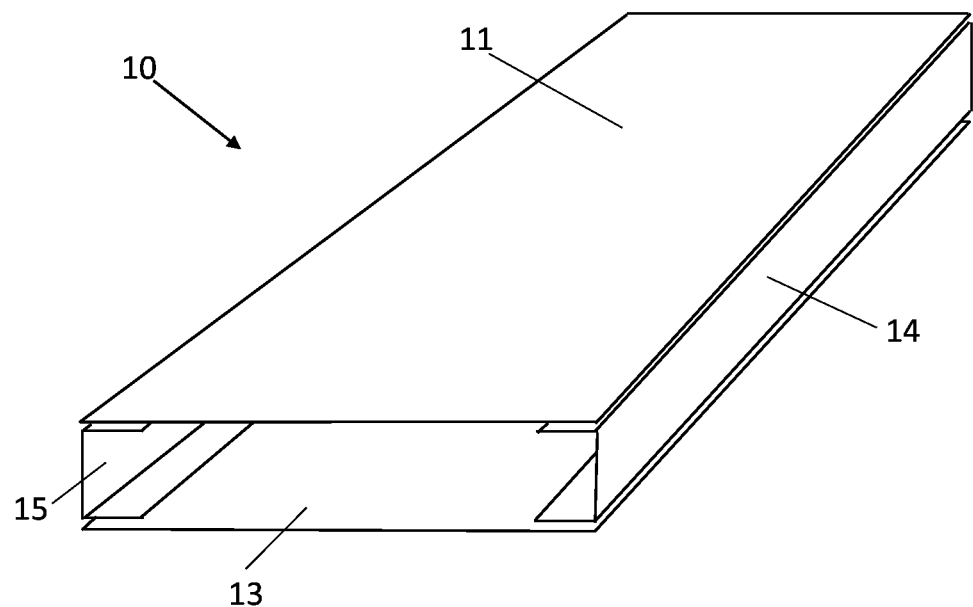
FIG. 2 shows a schematic perspective view of a wing-box structure.

FIG. 2 illustrates a schematic view of the wing box 10 of the starboard wing 3 of the aircraft 1. As shown in FIG. 1, the wing 3 is tapered from the inboard root end of the wing 3 to the outboard tip end of the wing 3 such that the chord length of the wing 3 decreases from the inboard end to the outboard end, and the thickness of the wing 3 decreases from the inboard end to the outboard end. Correspondingly, the wing box 10 is also tapered in both these directions. The wing box 10 is a support structure arranged to support a significant proportion of the loads on the wing 3. The wing box 10 has an upper cover 11, a front spar 14, a lower cover 13 and a rear spar 15. The upper cover 11 extends substantially the entire length of wing 3, from the wing root end to the wing tip end.

The front and rear spars 14, 15 are each longitudinal spars extending in the spanwise direction of the wing 3, and each have a lower attachment flange attached to a lower cover 13 and an upper attachment flange attached to the upper cover 11. The front and rear spars 14, 15 are substantially C-shaped.

The upper cover 11 and lower cover 13 have outer aerodynamic surfaces. The wing 3 also includes a leading edge structure (not shown) and a trailing edge structure (not shown) that are aerodynamically shaped to combine with the wing box 10 to form an aerofoil shaped body of the wing 3 as shown in FIG. 1.

Figure 3:
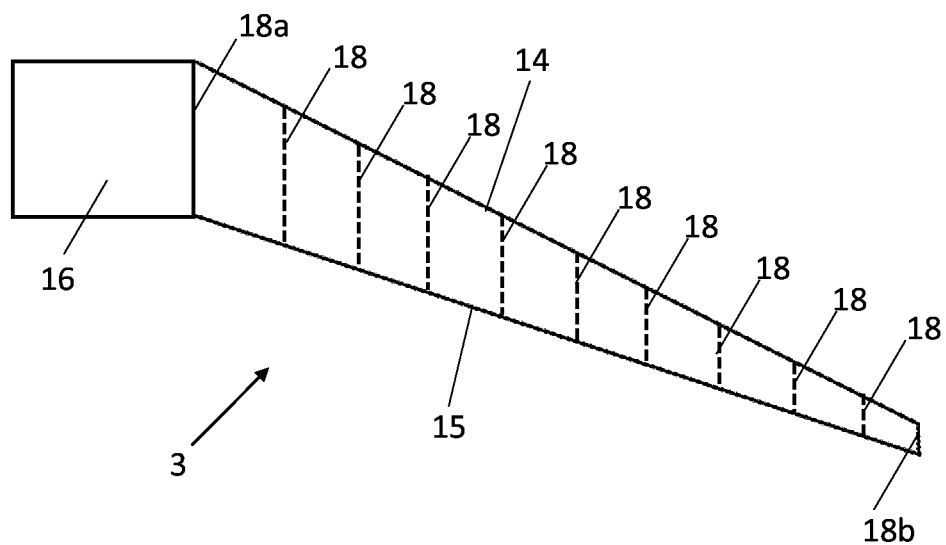
FIG. 3 shows a schematic plan view of a wing-box structure.

The covers 11, 13 may be reinforced with stringers. Stringers are spanwise extending reinforcing members attached to or integrally formed with the inside of the covers 11, 13. The wing box 10 of the wing 3 also includes a plurality of chordwise ribs 18, 18a, 18b, as shown in FIG. 3, extending between the spars 14, 15 and between the covers 11, 13.

The aircraft 1 includes a centre wing box 16 within the body of the fuselage 4. The centre wing box 16 is joined to an inboard rib 18a proximate the root end of the wing 3. The wing 3 includes a series of intermediate ribs 18 between the inboard rib 18a and an outboard rib 18b proximate the starboard wing tip end.

It will be appreciated that the wing box 10 of the wing 3 may have a variety of alternative constructions in which at least one of the front and rear spars 14, 15 is integrally formed with at least one of the upper and lower covers 11, 13. For example, the upper cover and front spar may be integrated as a single spar-cover component and a lower attachment flange of the front spar may extend forwardly from the vertical spar web to form a substantially 'Z' shaped spar-cover component. In a further alternative wing box construction, one of the upper and lower covers may be integrally formed with the front and rear spars to form a 'U' or 'N' shaped component to which the other cover is added to complete the wing box structure.

Figure 4:
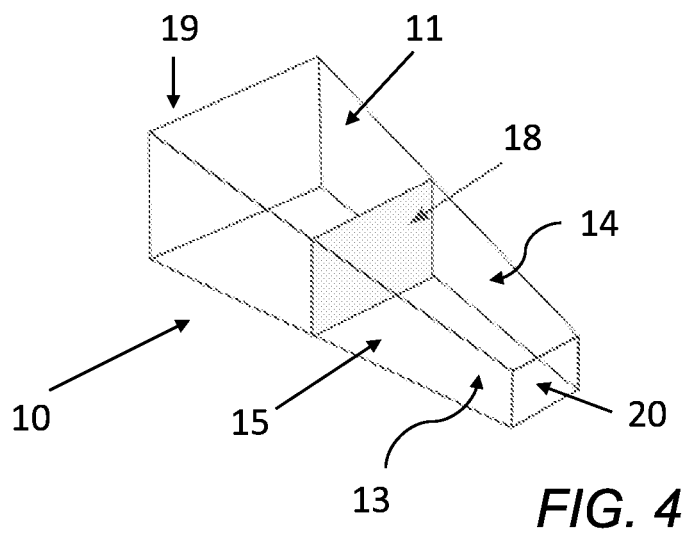
FIG. 4 shows a schematic perspective view of a wing-box structure.

In a preferred arrangement the wing box structure 10 comprises a fully integrated spars and covers construction to form an enclosed 'sock'. This fully integrated spars and covers construction may be formed of fibre reinforced composite material e.g. by filament winding. The fibre reinforced composite material may be cured to form the core of the wing structure. The fully integrated spars and covers 11, 13, 14, 15 may still require reinforcement with internal ribs 18 as shown in FIG. 4. It will be appreciated that the schematic wing box structure 10 shown in FIG. 4 may have any of the wing box structures described above with any amount of integration of the spars and covers, including no integration.

As can be seen in FIG. 4, the front and rear spars 14, 15 and/or the upper and lower covers 11, 13 may converge in the longitudinal (spanwise) direction of the wing box structure 10. Where the spars 14, 15 converge, the chordwise length of the wing box structure 10 reduces in the longitudinal direction of the wing box structure 10 from the root end 19 of the wing to the tip end 20 of the wing. Where the covers 11, 13 converge, the height of the wing box structure reduces in the longitudinal direction of the wing box structure 10 from the root end 19 to the tip end 20.

With reference to FIGS. 5-8 an assembly process for installing ribs 18 in the wing box structure 10 will be described. FIGS. 5-8 show section views through the wing box structure 10 which may be taken in either the vertical or horizontal planes orthogonal to the longitudinal direction of the wing box structure. For brevity, FIGS. 5-8 will be described as a vertical section through the upper and lower covers 11, 13, but it will be appreciated that these figures and the construction method described below may be applied equivalently for a horizontal section through the front and rear spars 14, 15.

Figure 5:
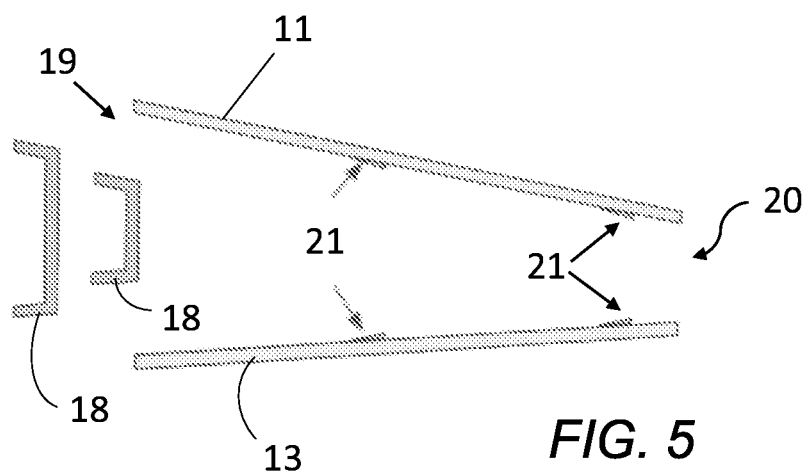
FIGS. 5 to 8 show schematic views of an assembly process for installing ribs in a wing-box structure.

As shown in FIG. 5, the upper and lower covers 11, 13 each carry a pair of opposed captive features 21 for retaining a respective one of the ribs 18. The pair of opposed captive features are disposed on an interior side of the upper and lower covers 11, 13. In FIG. 5 the ribs 18 are illustrated in a floating position prior to assembly with the remainder of the wing box structure 10.

The captive features 21 are structural elements which are designed to provide a mechanical hold on the rib 18 when the rib is installed in the wing box structure 10. The captive features 21 are provided as an opposed pair on opposite sides of the rib 18 so that the rib is mutually held by the opposing pair of captive features.

In the arrangement illustrated in FIG. 5, the captive features 21 may each comprise a projection with which the rib 18 is to be engaged to constrain the rib from translation over the interior surface of the upper and lower covers 11, 13 in the longitudinal direction of the wing box structure 10. The respective ribs 18 are configured to be translated in the longitudinal direction of the wing box structure 10 from near the root end 19 towards the tip end 20 so as to become captive against the projection of the captive features 21 so as to form a snap fit, or 'click fit', connection. In the illustrated example of FIG. 5, the captive features 21 each comprise a projection formed as a ramp having a sloping face away from the tip end 20 and a bluff face facing towards the tip end 20.

Figure 6:
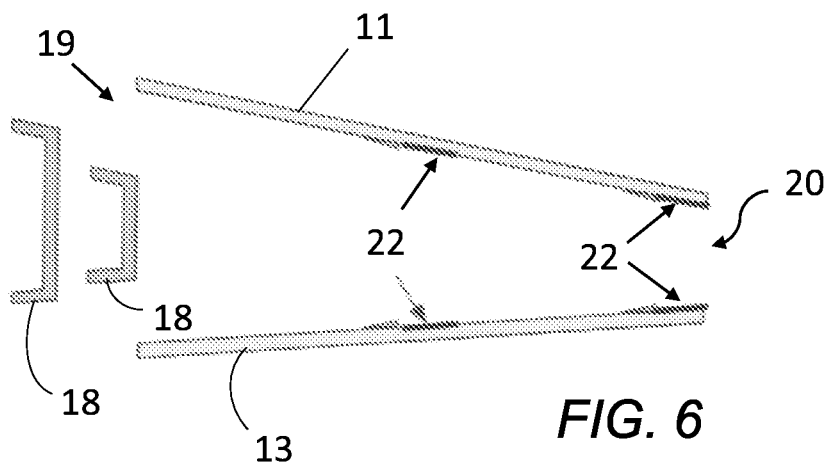

As shown in FIG. 6, a bond line of adhesive 22 may be provided adjacent the bluff face of the ramp projection style captive features 21. This adhesive 22 may form a continuous or near continuous bond line around the interior side of the upper and lower covers 11, 13 and the front and rear spars 14, 15 so as to substantially surround the location where one of the ribs 18 is to be retained. As can be seen, the ribs 18 have different sizes according to the geometry of the wing box structure at each location where the respective rib is to be retained with respect to the covers and spars of the wing box structure. The ribs 18 are arranged in size order such that the smallest rib 18 is installed first from the root end 19.

Figure 7:
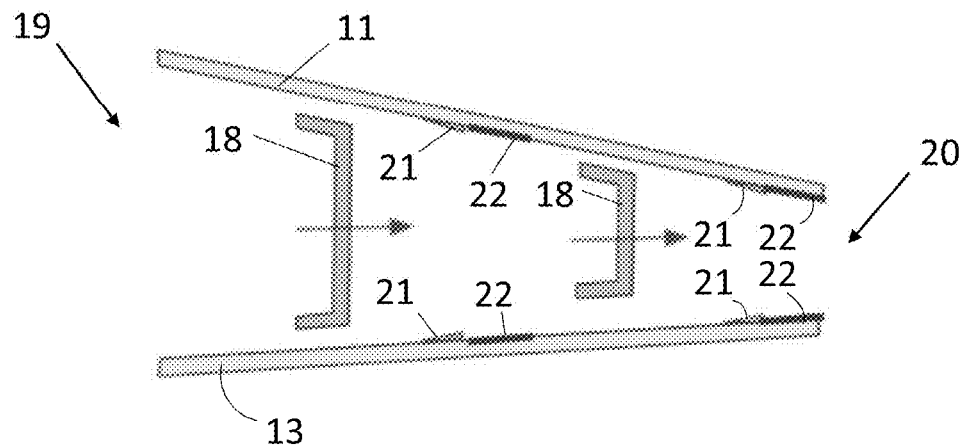

As shown in FIG. 7, the ribs 18 are passed along the inside of the wing box structure 10 in the direction of convergence of the wing box structure in order of increasing rib size. The ribs 18 may or may not be moved simultaneously, e.g. the ribs 18 may be installed sequentially starting with the smallest first.

Whilst in FIG. 7 the ribs 18 are shown to move in their orientation corresponding to their final orientation, it will be appreciated that one or more of the ribs may be passed along the inside of the wing box structure in a first orientation in which the rib is tilted towards a mid-plane of the upper and lower covers 11, 13, and then rotated to a second orientation in the vicinity of the pair of opposed captive features 21 corresponding to their final orientation within the wing box structure 10.

Figure 8:
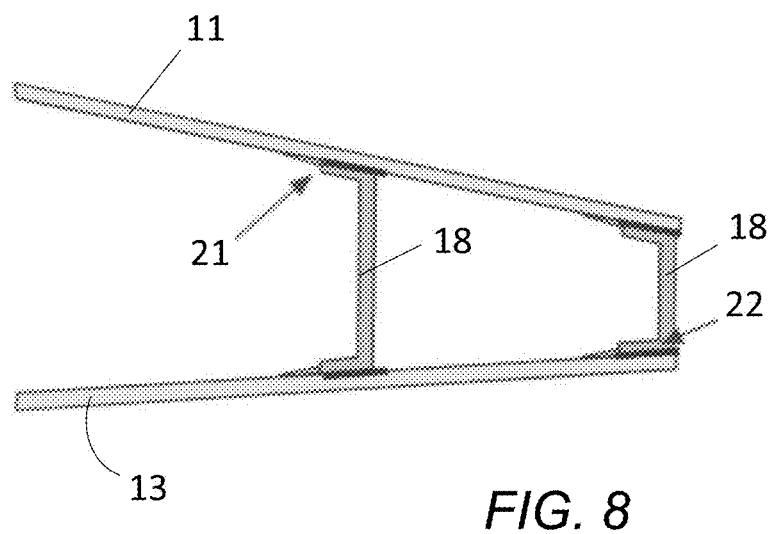

As each rib 18 is moved inside the wing box structure 10 they encounter their respective pair of captive features 21. The rib 18 is configured to be translated over the captive feature 21, which is just smaller than the rib to ensure the rib is held in place once the rib passes over the apex of the ramp of the captive feature 21. The rib 18 then makes contact with the adhesive 22 and the tapering of the wing box structure and the captive feature 21 together hold the rib 18 captive while the adhesive 22 cures. Once the adhesive 22 cures the rib 18 is securely held in place in its desired location so as to complete the wing box structure 10, as shown in FIG. 8.

Figures 9A, 9B, 9C:
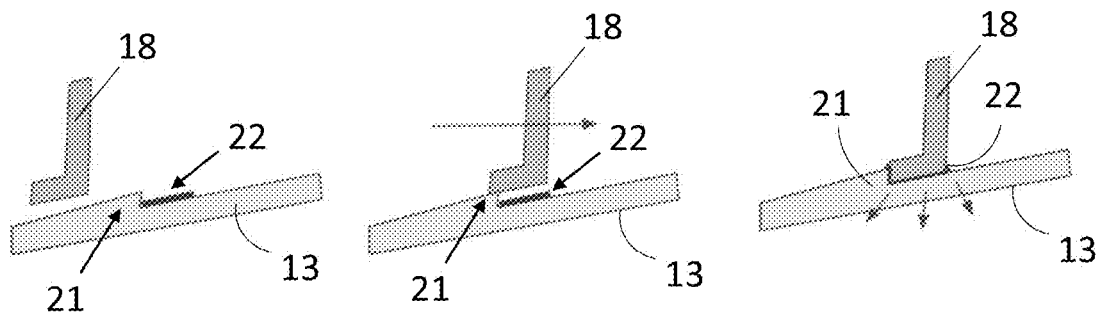
FIGS. 9 A) to 9 C) shows detail views of a rib installation sequence in the assembly process.

FIGS. 9a-9c show this rib installation sequence in greater detail. In FIG. 9a, the adhesive 22 is applied adjacent the bluff face of the ramp forming the captive feature 21 on the interior surface of the lower cover 13 and the rib 18 is positioned adjacent the sloping face of the captive feature 21. In FIG. 9b the rib 18 is advanced in the longitudinal direction of the wing box structure 10 over the apex of the ramp captive feature 21. In FIG. 9c the rib 18 passes the apex of the ramp captive feature 21 and 'clicks' into position and contacts the adhesive 22 which exudes around the foot of the rib 18. FIGS. 9a to 9c show this installation in sequence.

This process is repeated until all of the ribs 18 are installed and the adhesive 22 is cured. In a preferred embodiment the cured adhesive is all that is required to carry all the loads between the spars and covers and the ribs within the wing box structure, preferably without bolting. This allows for a more weight efficient structure, resulting in lower cost and reduced fuel burn related emissions in service. However, if required a small number of fasteners, e.g. bolts, may be used for fastening the rib to the front and rear spars and/or the upper and lower covers at the location where the rib is retained.

The adhesive 22 may be a 'low grab' adhesive as it may not be necessary to provide a 'high grab' adhesive since the position of the rib is aided by the tapering geometry of the wing box structure and by the captive features 21. The adhesive 22 may have a relatively long pot life, e.g. of approximately two days, to allow all of the ribs to be positioned within the wing box structure 10 and then all allowed to fully cure. A heat source may be used to cure the adhesive 22 at each of the respective rib locations simultaneously. For example, an electric heater mat may be used which is energised simultaneously at each of the bond lines of the adhesive 22.

Whilst the captive features 21 have some additional weight penalty on the overall mass of the wing box structure 10, this can be offset by the absence of a large number of fasteners joining the ribs to the spars and covers of the wing box structure. Not only is the weight of fasteners avoided but the build-up of structural thickness in the spars and covers around fastener holes to carry filled-hole compression loads is also avoided. The filled hole compression failure mode is especially important in composite structures as the fibre of the zero degree plies are interrupted by any holes necessitating build up of +/−45 degrees plies around the hole location to withstand these loads. Ramping up or down these additional +/−45 degree plies creates a significant amount of 'dead material'. The savings in cover/spar thickness and fewer fasteners provides weight savings which are expected to more than outweigh the additional weight of the captive features. The adhesive bonding of the ribs 18 to the spars and covers creates a permanent join.

Whilst this bonded joint may not allow ready disassembly of an individual rib from the wing box structure, in practice it may be no more difficult than a more conventional bolted wing box construction where an interfay sealant is typically used between the rib and cover or rib and spar interfaces. The ability of the adhesive bonded joint to transfer all of the required loads between the rib and the remainder of the wing box structure will be sufficient and any failure of the adhesive would still not lead to much or any movement of the rib as it is held captive between the captive features 21 and the tapering geometry of the spars and covers. The amount of the adhesive 22 used in the different rib locations may be varied according to local load requirements.

The absence of fastener holes through use of the bonded joint construction is especially beneficial in removing metal components from the wing box structure which may otherwise require lightning strike mitigation. Avoiding these lightning strike mitigations, such as fastener nut caps, may further offset the weight penalty of the captive features and may lead to an overall weight reduction of the wing box structure.

In addition to any weight saving that may be achieved, avoiding fastener installation for joining the rib to the spars and covers may significantly improve assembly time and tooling. For example, with a composite wing cover and a metallic rib foot multiple drill tools are typically required when forming fastener holes for installing fasteners for joining the rib to the remainder of the wing box structure. Other materials, such as ceramic or glass shims may also be used in a conventional wing box construction with bolted joints. Avoiding these difficult to drill fastener holes carries a significant time and tooling saving which may substantially increase the potential production rate of a wing set.

Figure 10A:
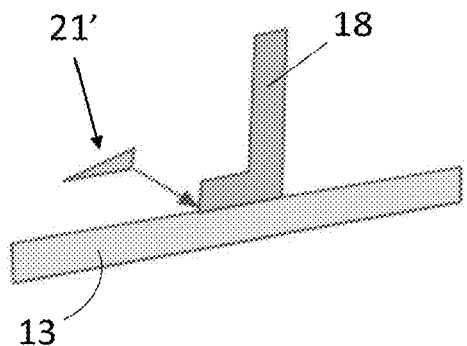
FIGS. 10 A) to 10 D) show alternative detail views of a rib installation.

FIGS. 10a-10d illustrate a variety of different concepts for the arrangement of the captive feature, which in each case would be provided as a pair of opposed captive features disposed on the interior side of either the front and rear spars or the upper and lower covers as described above. In FIG. 10a the rib 18 is advanced along the wing box until the foot of the rib engages with the interior side of the cover 13 due to the tapering geometry, and then a captive feature 21' is added after the rib 18 has been installed. The captive feature 21' may be a wedge shaped member substantially the same as the captive feature 21 described above and formed as a ramp having a sloping surface and a bluff surface with a lower attachment surface for adhering or otherwise affixing to the interior surface of the cover 13. The captive feature 21' may be secured by bonding or welding for example.

Figure 10B:
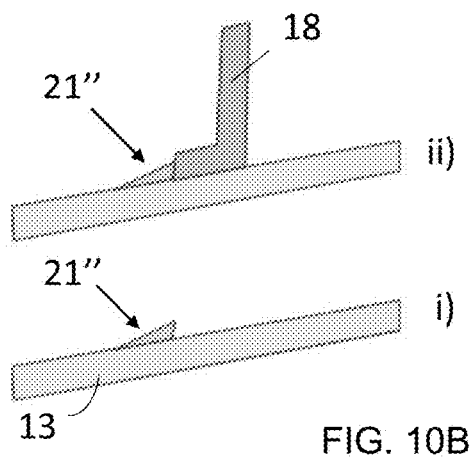

In FIG. 10b, the captive feature 21" is a component pre-installed on the interior surface of the cover 13 ready to accept the rib 18 when it reaches the correct position. FIG. 10b(i) shows the captive feature 21" pre-attached as a discrete component and FIG. 10b(ii) shows the installed rib 18 in a manner similar to that described above with reference to FIGS. 5-8.

Figure 10C:
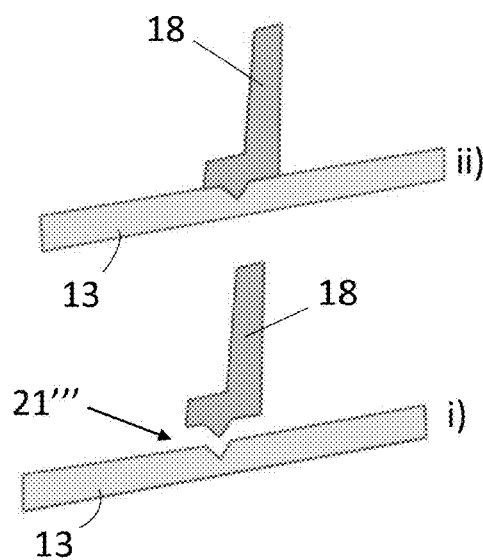

In FIG. 10c the captive feature 21'" is provided as a recess in the interior surface of the cover 13 and a corresponding projection on the base of the foot of the rib 18. FIG. 10c(i) shows the cover 13 and rib 18 components from which it can be seen that when the rib reaches the desired position, the protrusion feature on the base of the rib foot engages with the recess in the interior surface of the cover 13 and holds the rib in place. FIG. 10c(ii) shows the installed rib.

Figure 10D:
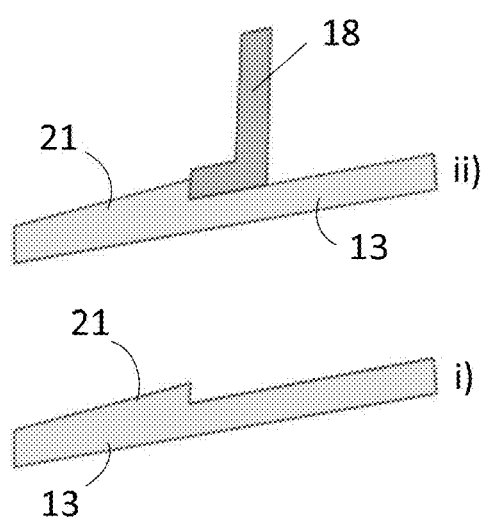

FIG. 10d shows the captive feature 21 as described above as an integrated projecting ramp on the inner surface of the cover 13 as described above with reference to FIGS. 5-8.

It will be appreciated that the captive feature may take a variety of alternative forms and may comprise any projection or recess on or into an interior surface of the front and rear spars or the upper and lower covers with which the rib is engaged to constrain the rib from translation over the interior surface. Each captive feature may include a plurality of recesses and/or protrusions. In a further example which may be suitable where the wing box does not have a geometric taper in either the height or the chordwise dimension, so that the tapering geometry is not available to constrain the spanwise outboard movement of the rib, then an integrated or attached captive feature may be provided so as to provide a projection against which the outboard facing surface of the rib web engages in addition to any of the captive features shown in FIGS. 10a-10d so as to constrain movement of the rib inboard once installed in the wing box structure. It will further be appreciated that with a parallel, un-tapered, wing ribs installation may occur though either (or both) of the root end and tip end of the wing box structure.

As is conventional, the upper and/or lower covers may include longitudinal stringers and the rib may include mouseholes to receive the stringers. The wing box structure may comprise a plurality of spanwise sections of the wing box structure, joined together. Although in the above-described embodiments the wing box structure is for an aircraft wing, it will be appreciated that a similar construction may be applied for an aircraft vertical tailplane, horizontal tailplane, wingtip device or any aerofoil structure whether for an aircraft or otherwise, comprising a wing box structure similar to that described above.

Figure 11A:
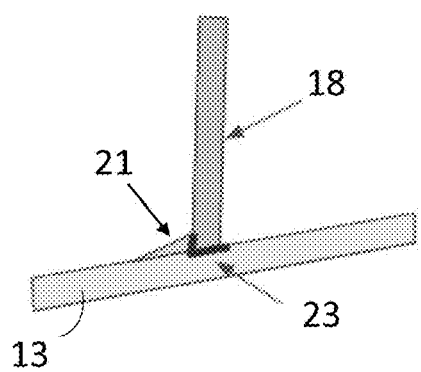
FIGS. 11 A) and 11 B) show alternative details views of a rib installation.
Figure 11B:
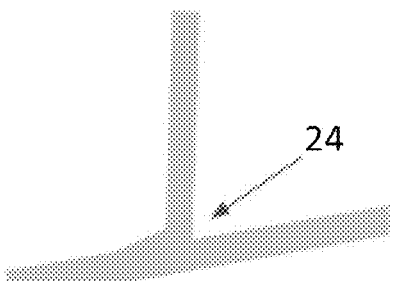

FIGS. 11a and 11b show alternative detail views of a rib installation. In FIG. 11a a weldable material 23 may be used in combination with the captive feature 21 instead of the adhesive 22. The weldable material 23 may be a thermoplastic matrix in a carbon fibre composite for example. The weldable material 23 may be locally heated to join the rib 18 to the cover 13. A resistive heating mat may be used at the joint location to allow a targeted application of heat for a localised melt and structural consolidation. The rib 18 may have a simplified construction and may have no rib foot. FIG. 11b shows the consolidated part in which the captive feature 21 becomes integrally formed with the cover 13 and the rib 18 to form a fully integrated rib/rib foot/cover 24.

The wing covers may include one or more man holes for accessing the interior of the wing box structure. A plurality of individual bays may be defined within the wing box structure, separated by the ribs. A manhole may be provided for each bay, or only some of these bays. These man holes may allow personnel or tooling to access the bay during assembly of the wing box structure, e.g. for positioning the ribs, for applying the adhesive for securing the ribs, for installing the captive features; or for disassembly of a rib from an in service wing.

The wing may have more than two spars, in which case any adjacent pair of spars may be termed the forward and rearward spars. In a three spar wing, for example, there may be a rib between the front spar and the mid spar and another rib between the mid spar and the rear spar at each rib location of the wing box.

Where the word 'or' appears this is to be construed to mean 'and/or' such that items referred to are not necessarily mutually exclusive and may be used in any appropriate combination.

Although the invention has been described above with reference to one or more preferred embodiments, it will be appreciated that various changes or modifications may be made without departing from the scope of the invention as defined in the appended claims.

The invention claimed is:

1. A wing-box structure for an aircraft, comprising:
an upper cover,
a lower cover,
longitudinal forward and rearward spars, and
a plurality of transverse ribs, wherein one of the transverse ribs is retained by a pair of opposed captive features disposed on an interior side of either the forward and rearward spars or the upper and lower covers, and adhesive or weldable material for bonding the rib to the forward and rearward spars and/or the upper and lower covers at a location where the rib is retained,
wherein the captive features each comprise a projection or a recess on or into the interior surface of the forward and rearward spars or the upper and lower covers with which the rib is engaged to constrain the rib from translation over the interior surface, and
wherein, during assembly of the wing-box structure, the rib is configured to be translated in the longitudinal direction of the wing-box structure to become captive against or in the projection or recess to form a snap-fit connection.

2. A wing-box structure according to claim 1, wherein the captive features are attached to or integrated with the forward and rearward spars or the upper and lower covers.

3. A wing-box structure according to claim 1, wherein each projection is a ramp having a sloping face and a bluff face.

4. A wing-box structure according to claim 1, wherein each recess cooperates with a respective projection formed on the rib, or wherein each projection cooperates with a respective projection formed on the rib.

5. A wing-box structure according to claim 1, further comprising one or more fasteners for fastening the rib to the forward and rearward spars and/or the upper and lower covers at a location where the rib is retained.

6. A wing-box structure according to claim 1, wherein at least one of the forward and rearward spars is integrally formed with at least one of the upper and lower covers.

7. A wing-box structure according to claim 1, wherein the forward and rearward spars and/or the upper and lower covers converge in the longitudinal direction of the wing-box structure.

8. A wing-box structure according to claim 7, wherein the convergence of the forward and rearward spars and/or the upper and lower covers constrains movement of the rib away from the captive features, so that the rib is retained between the captive features and the convergent geometry.

9. A wing-box structure according to claim 1, wherein the captive features are configured to allow one-way installation of the rib.

10. A wing-box structure according to claim 1, further comprising a respective pair of opposed captive features on either the forward and rearward spars or the upper and lower covers for each respective transverse rib, wherein each of the respective transverse ribs is retained by the respective pair of opposed captive features.

11. An aircraft wing, vertical tailplane, horizontal tailplane, wing-tip device, or any aerofoil structure comprising a wing-box structure according to claim 1.

12. A wing-box structure according to claim 1, wherein the captive features provide a mechanical engagement between an interior surface of the forward and rearward spars or the upper and lower covers and the rib to constrain the rib from longitudinal translation over the interior surface.

13. A method of assembling a wing-box structure, comprising:
at least partially assembling an upper cover, a lower cover, and longitudinal forward and rearward spars;
providing a pair of opposed captive features on an interior side of either the forward and rearward spars or the upper and lower covers;
passing at least one transverse rib along the at least partially assembled upper and lower covers and longitudinal forward and rearward spars until the rib engages with the pair of opposed captive features so that the rib is retained by the pair of opposed captive features in a snap-fit connection; and
bonding the rib to the forward and rearward spars and/or the upper and lower covers at a location where the rib is retained.

14. A method according to claim 13, further comprising providing a respective pair of opposed captive features on either the forward and rearward spars or the upper and lower covers for each respective transverse rib, and passing each of a plurality of transverse ribs along the at least partially assembled upper and lower covers and longitudinal forward and rearward spars until the respective rib engages with the pair of opposed captive features so that the respective rib is retained by the respective pair of opposed captive features.

15. A method according to claim 14, wherein the forward and rearward spars and/or the upper and lower covers converge in the longitudinal direction of the wing-box structure, and wherein the plurality of transverse ribs have different sizes, the method further comprising passing the plurality of transverse ribs along the assembly in the direction of the convergence in order of increasing rib size.

16. A method according to claim 14, wherein the at least one transverse rib is passed along the assembly in a first orientation in which the rib is tilted towards a plane of the upper or lower covers, and then rotated to a second orientation in the vicinity of the pair of opposed captive features.

17. A method according to claim 13, wherein the at least one transverse rib is moved in the longitudinal direction of the wing-box structure over an interior surface of the at least partially assembled upper and lower covers and longitudinal forward and rearward spars until the rib mechanically engages with the pair of opposed captive features so that the rib is retained by the pair of opposed captive features to constrain the rib from longitudinal translation over the interior surface.

18. A wing-box structure for an aircraft, comprising:
an upper cover,
a lower cover,
longitudinal forward and rearward spars, and
a plurality of transverse ribs, wherein one of the transverse ribs is retained by a pair of opposed captive features disposed on an interior side of either the forward and rearward spars or the upper and lower covers, and adhesive or weldable material for bonding the rib to the forward and rearward spars and/or the upper and lower covers at a location where the rib is retained,
wherein the captive features each comprises a projection or a recess disposed on the interior surface of the forward and rearward spars or the upper and lower covers, and
wherein each projection includes a ramped surface oriented in the longitudinal direction of the wing-box structure to guide the rib during insertion, and a bluff face oriented to retain the rib after insertion after insertion;
wherein, during assembly of the wing-box structure, the rib is configured to be translated in the longitudinal direction of the wing-box structure to become captive against or in the projection or recess.

* * * * *